United States Patent
Otake et al.

(10) Patent No.: US 8,441,204 B2
(45) Date of Patent: May 14, 2013

(54) POWER SUPPLY DEVICE AND LIGHTING EQUIPMENT PROVIDED WITH POWER SUPPLY DEVICE

(75) Inventors: Hirokazu Otake, Yokosuka (JP); Takuro Hiramatsu, Yokosuka (JP); Mitsuhiko Nishiie, Yokosuka (JP)

(73) Assignees: Toshiba Lighting & Technology Corp., Kanagawa (JP); Kabushiki Kaisha Toshiba, Tokyo (JP)

( * ) Notice: Subject to any disclaimer, the term of this patent is extended or adjusted under 35 U.S.C. 154(b) by 198 days.

(21) Appl. No.: 12/873,759

(22) Filed: Sep. 1, 2010

(65) Prior Publication Data

US 2011/0057577 A1  Mar. 10, 2011

Related U.S. Application Data (63) Continuation of application No. PCT/JP2009/055873, filed on Mar. 24, 2009.

(30) Foreign Application Priority Data

Mar. 24, 2008 (JP) ................. 2008-076837

(51) Int. Cl.
*H05B 37/02* (2006.01)
(52) U.S. Cl.
USPC ................ 315/291; 315/209 R; 315/360
(58) Field of Classification Search ............ 315/209 R, 315/246, 276, 283, 291, 360
See application file for complete search history.

(56) References Cited

U.S. PATENT DOCUMENTS

| | | | |
|---|---|---|---|
| 4,864,482 A | 9/1989 | Quazi et al. | |
| 5,811,941 A | 9/1998 | Barton | |
| 5,834,924 A | 11/1998 | Konopka | |
| 6,153,980 A | 11/2000 | Marshall | |
| 6,628,093 B2 | 9/2003 | Stevens | |
| 6,747,420 B2 | 6/2004 | Barth | |
| 6,787,999 B2 * | 9/2004 | Stimac et al. | 315/51 |
| 6,969,977 B1 | 11/2005 | Smith | |
| 6,998,792 B2 | 2/2006 | Takahashi | |
| 7,081,709 B2 | 7/2006 | Pak | |
| 7,106,036 B1 | 9/2006 | Collins | |

(Continued)

FOREIGN PATENT DOCUMENTS

| | | |
|---|---|---|
| CN | 201039532 Y | 3/2008 |
| EP | 2257130 | 12/2010 |

(Continued)

OTHER PUBLICATIONS

Image File Wrapper of U.S. Appl. No. 12/885,053 electronically captured on May 18, 2012.

(Continued)

*Primary Examiner* — Thuy Vinh Tran
(74) *Attorney, Agent, or Firm* — Banner & Witcoff, Ltd.

(57) ABSTRACT

A power supply device according to one embodiment is configured to control a lighting of semiconductor light-emitting elements, wherein a dimming signal is canceled during a predetermined time period (T) from a timing immediately after power-ON, so as to light on light-emitting diodes to have a predetermined light amount, for example, a minimum light amount. After an elapse of the predetermined time period (T), cancellation of the dimming signal is released to light on the light-emitting diodes to have a light amount instructed by the dimming signal.

4 Claims, 5 Drawing Sheets

U.S. PATENT DOCUMENTS

| | | | |
|---|---|---|---|
| 7,164,235 B2 | 1/2007 | Ito | |
| 7,202,608 B2 | 4/2007 | Robinson | |
| 7,262,559 B2* | 8/2007 | Tripathi et al. | 315/291 |
| 7,557,520 B2 | 7/2009 | Chen | |
| 7,791,326 B2* | 9/2010 | Dahlman et al. | 323/284 |
| 7,804,256 B2* | 9/2010 | Melanson | 315/291 |
| 7,906,917 B2* | 3/2011 | Tripathi et al. | 315/291 |
| 7,999,484 B2 | 8/2011 | Jurngwirth | |
| 8,013,544 B2* | 9/2011 | Negrete et al. | 315/307 |
| 8,018,171 B1* | 9/2011 | Melanson et al. | 315/194 |
| 8,018,173 B2 | 9/2011 | Shackle | |
| 8,044,608 B2 | 10/2011 | Kuo | |
| 8,076,867 B2* | 12/2011 | Kuo et al. | 315/291 |
| 8,093,826 B1 | 1/2012 | Eagar | |
| 8,102,127 B2* | 1/2012 | Melanson | 315/178 |
| 8,134,304 B2 | 3/2012 | Hsu | |
| 2005/0253533 A1 | 11/2005 | Lys | |
| 2006/0192502 A1 | 8/2006 | Brown | |
| 2006/0238174 A1 | 10/2006 | Russell | |
| 2007/0030709 A1 | 2/2007 | Kitagawa | |
| 2007/0182347 A1 | 8/2007 | Shteynberg et al. | |
| 2007/0188112 A1 | 8/2007 | Kang et al. | |
| 2007/0216320 A1 | 9/2007 | Grivas | |
| 2008/0054817 A1* | 3/2008 | Kao et al. | 315/209 R |
| 2008/0074058 A1 | 3/2008 | Lee et al. | |
| 2008/0258647 A1 | 10/2008 | Scianna | |
| 2008/0259655 A1* | 10/2008 | Wei et al. | 363/21.18 |
| 2008/0316781 A1 | 12/2008 | Liu | |
| 2009/0021470 A1 | 1/2009 | Lee | |
| 2009/0079363 A1 | 3/2009 | Ghoman | |
| 2009/0116232 A1 | 5/2009 | Chang | |
| 2009/0121641 A1 | 5/2009 | Shih | |
| 2010/0207536 A1 | 8/2010 | Burdalski | |
| 2010/0289426 A1 | 11/2010 | Takasaka | |
| 2010/0308742 A1* | 12/2010 | Melanson | 315/224 |
| 2011/0291587 A1* | 12/2011 | Melanson et al. | 315/291 |

FOREIGN PATENT DOCUMENTS

| | | |
|---|---|---|
| JP | 02-284381 | 11/1990 |
| JP | 09-045481 | 2/1997 |
| JP | 10-064683 | 6/1998 |
| JP | 11-087072 | 3/1999 |
| JP | 2001-210478 | 8/2001 |
| JP | 2002-231471 | 8/2002 |
| JP | 2003-157986 | 5/2003 |
| JP | 2004-119078 | 4/2004 |
| JP | 2004-265756 | 9/2004 |
| JP | 2004-327152 | 11/2004 |
| JP | 2005-011739 | 1/2005 |
| JP | 2005-129512 | 5/2005 |
| JP | 2006-054362 | 2/2006 |
| JP | 2006-108117 | 4/2006 |
| JP | 2006-269349 | 10/2006 |
| JP | 2007-6658 | 1/2007 |
| JP | 2007-234415 | 9/2007 |
| JP | 2007-281424 | 10/2007 |
| JP | 2007-306644 | 11/2007 |
| JP | 2007-538378 | 12/2007 |
| JP | 2008-053695 | 3/2008 |
| JP | 2008-210537 | 9/2008 |
| JP | 2008-310963 | 12/2008 |
| JP | 2009-218528 | 9/2009 |
| JP | 2009-232625 | 10/2009 |
| WO | WO 99/56504 | 11/1999 |
| WO | WO 2005/115058 | 12/2005 |
| WO | WO 2009/055821 | 4/2009 |
| WO | WO 2009/119617 | 10/2009 |

OTHER PUBLICATIONS

Image File Wrapper of U.S. Appl. No. 12/557,179 electronically captured on May 18, 2012.
International Preliminary Report on Patentability for International Patent Application No. PCT/JP2009/055871 dated Nov. 18, 2010.
English Translation of Written Opinion of the International Search Authority for International Patent Application No. PCT/JP2009/055871 dated Nov. 18, 2010.
Japanese Office Action issued in JP 2008-076837 on Jul. 6, 2010.
English Translation of Japanese Office Action issued in JP 2008-076837 on Jul. 6, 2010.
English Language Abstract of JP 2006-108117 published Apr. 20, 2006.
Machine Translation of JP 2006-108117 published Apr. 20, 2006.
English Language Abstract of JP 2008-281424 published Nov. 20, 2008.
Machine Translation of JP 2008-281424 published Nov. 20, 2008.
Japanese Office Action issued in JP 2008-076835 on Aug. 24, 2010.
English Translation of Japanese Office Action issued in JP 2008-076835 on Aug. 24, 2010.
Extended European Search Report issued in European Appl. 09011497.6 on Jan. 28, 2010.
English Language Abstract of JP 2004-265756 published on Sep. 24, 2004.
English Language Translation of JP 2004-265756 published on Sep. 24, 2004.
Japanese Office Action issued in JP 2008-076837 on Nov. 24, 2010.
English Translation of Japanese Office Action issued in JP 2008076837 on Nov. 24, 2010.
English Abstract of JP 2009-232625 published Oct. 8, 2009.
English Translation of JP 2009-232625 published Oct. 8, 2009.
English Abstract of JP 2007-306644 published Nov. 22, 2007.
English Translation of JP 2007-306644 published Nov. 22, 2007.
Image File Wrapper of Related U.S. Appl. No. 12/777,303 electronically captured on Mar. 13, 2012.
Image File Wrapper of U.S. Appl. No. 12/777,303 electronically captured on Nov. 3, 2011.
Image File Wrapper of U.S. Appl. No. 12/873,348 electronically captured on Nov. 3, 2011.
Image File Wrapper of U.S. Appl. No. 12/874,282 electronically captured on Nov. 3, 2011.
Image File Wrapper of U.S. Appl. No. 12/885,053 electronically captured on Nov. 3, 2011.
Image File Wrapper of U.S. Appl. No. 12/860,528 electronically captured on Nov. 3, 2011.
Image File Wrapper of U.S. Appl. No. 12/557,179 electronically captured on Nov. 3, 2011.
Image File Wrapper of U.S. Appl. No. 12/764,995 electronically captured on Nov. 3, 2011.
Image File Wrapper of U.S. Appl. No. 12/873,744 electronically captured on Nov. 3, 2011.
Extended European Search Report issued in EP 10177426.3 on May 4, 2011.
Extended European Search Report issued in EP 10162031.8 on Jul. 21, 2011.
Chinese Office Action mailed Jul. 21, 2011 in CN 201010178232.8.
English Language Translation of Chinese Office Action mailed Jul. 21, 2011 in CN 201010178232.8.
English language abstract of JP 2008-210537, published Sep. 11, 2008.
Machine English language translation of JP 2008-210537, published Sep. 11, 2008.
English language abstract of JP-2008-053695 published Mar. 6, 2008.
Machine English language translation of JP-2008-053695 published Mar. 6, 2008.
English language abstract of JP-2007-538378 published Dec. 27, 2007.
Machine English language translation of JP-2007-538378 published Dec. 27, 2007.
nglish language abstract of JP 2005-11739 published Jan. 13, 2005.
Machine English language translation of JP 2005-11739 published Jan. 13, 2005.
English language abstract of JP 11-087072 published Mar. 30, 1999.
Machine English lanouage translation of JP 11-087072 published Mar. 30, 1999,.
English Language Abstract of JP 2009-218528 Published Sep. 24, 2009.
English Language Translation of JP 2009-218528 Published Sep. 24, 2009.

English Language Abstract of JP 2004-119078 Published Apr. 15, 2004.
English Language Translation of JP 2004-119078 Published Apr. 15, 2004.
English Language Abstract of JP 2007-6658 Published Jan. 11, 2007.
English Language Translation of JP 2007-6658 Published Jan. 11, 2007.
English Language Abstract of JP 2003-157986 Published May 30, 2003.
English Language Translation of JP 2003-157986 Published May 30, 2003.
English Language Abstract of JP 2008-310963 Published Dec. 25, 2008.
English Language Translation of JP 2008-310963 Published Dec. 25, 2008.
International Search Report issued in PCT/JP2009/055871 on Jun. 9, 2009.
English Language Abstract of JP 2002-231471 Published Aug. 15, 2002.
English Language Translation of JP 2002-231471 Published Aug. 15, 2002.
English Language Abstract of JP 2004-327152 Published Nov. 18, 2004.
English Language Translation of JP 2004-327152 Published Nov. 18, 2004.
English Language Abstract of JP 2005-129512 Published May 19, 2005.
English Language Translation of JP 2005-129512 Published May 19, 2005.
English Language Abstract of JP 2007-234415 Published Sep. 13, 2007.
English Language Translation of JP 2007-234415 Published Sep. 13, 2007.
English Language Abstract of JP 2001-210478 Published Aug. 3, 2001.
English Language Translation of JP 2001-210478 Published Aug. 3, 2001.
English Language Abstract of JP 2006-269349 Published Oct. 5, 2006.
English Language Translation of JP 2006-269349 Published Oct. 5, 2006.
International Search Report issued in PCT/JP2009/055873 on Jun. 9, 2009.
Notice for corresponding Japanese Patent Application No. 2010-196338 DTD. Jul. 12, 2012.
Office Action for corresponding Japanese Patent Application No. 2010-196338 DTD. Jul. 26, 2012.
European Search Report for corresponding Patent Application No. 09725489.0 DTD. Aug. 17, 2012.
Notice of Reasons for Rejection for related Japanese patent application No. 2010-196338 mailed Jun. 14, 2012.
Notification of the First Office Action for related Chinese patent application No. 200980107917.9 mailed Sep. 28, 2012.

* cited by examiner

POWER SUPPLY DEVICE AND LIGHTING
EQUIPMENT PROVIDED WITH POWER
SUPPLY DEVICE

CROSS-REFERENCE TO RELATED
APPLICATIONS

This is a Continuation Application of PCT Application No. PCT/JP2009/055873, filed Mar. 24, 2009, which was published under PCT Article 21(2) in Japanese.

This application is based upon and claims the benefit of priority from Japanese Patent Application No. 2008-076837, filed Mar. 24, 2008; the entire contents of which are incorporated herein by reference.

FIELD

Embodiment described herein relate generally to a power supply device suited for driving a semiconductor light-emitting element such as a light-emitting diode, and a lighting equipment provided with this power supply device.

BACKGROUND

Recently, as a power supply for driving a semiconductor light-emitting element such as a light-emitting diode, a power supply device which switches a DC power using a switching element is popularly used.

A power supply device of this type is often used in a lighting equipment having a dimming function that can arbitrarily control an amount of light of a light source for lighting in, e.g., a store. Such lighting equipment generally uses a four-wire dimming system as a dimming system. This is because since a large number of lighting equipments are used in; e.g., a shore, the four-wire dimming system is free from any problem of generating harmonics in input currents unlike a dimming system based on phase control, and is suited to simultaneously operating a large number of equipments.

In a power supply device of the four-wire dimming system, a dimming operation member is integrally provided to a so-called wall switch generally allocated on a wall surface. To a mechanical switch of the dimming operation member, a dimming signal generator, which supplies a dimming signal to a load via a feeder terminal, is connected. This dimming signal generator outputs a dimming signal, which is supplied to each lighting equipment. In such power supply device, when the user turns on the mechanical switch of the dimming operation member, a power supply of a lighting equipment is turned on, and a power supply of the dimming signal generator is also turned on at the same time.

No problem is posed when the ON operation of the mechanical switch turns on (power-activates) the power supply of the dimming signal generator simultaneously with power-ON (power activation) of the lighting equipment, so as to immediately output a dimming signal, thus simultaneously attaining lighting and dimming of the lighting equipment. However, when the lighting equipment is lighted on before the dimming signal is output, the lighting equipment is lighted on for a certain period in a state the dimming signal is not input before the lighting equipment is controlled to a desired light amount by the dimming signal. In general, since the lighting equipment is set to light on in a full light state when no dimming signal is input, it is lighted on in a full light state only for a moment, and then transits to a dimmed state.

Since a lighting circuit of a general electric discharge lamp forms an advanced preheating state immediately after power activation, and is set intentionally not to light on a lamp for a while, no serious problem is posed. However, in a lighting equipment which uses a semiconductor light-emitting element such as a light-emitting diode as a recent light source, a phenomenon of causing a full light state only for a moment immediately after activation due to a delay of a dimming signal readily occurs, resulting in unnatural lighting transition as the lighting equipment. Hence, the merchantability of the lighting equipment is seriously impaired.

DETAILED DESCRIPTION

A power supply device and a lighting equipment provided with this power supply device according to an embodiment of the present invention will be described hereinafter with reference to the drawings.

In general, according to one embodiment, a power supply device comprises a DC output generation module, a semiconductor light-emitting element, and a control module. The DC output generation module is configured to receive an AC power, convert the AC power into a DC power, and output the DC power. The semiconductor light-emitting element is supplied with the DC power output from the DC output generation module, and emits light. The control module is configured to receive a dimming signal, and control the DC power output from the DC output generation module in accordance with the dimming signal. The control module controls the DC output generation module to dim and light on or off the semiconductor light-emitting element by canceling control of the DC power based on the dimming signal during a predetermined time period from a timing immediately after the AC power is supplied.

(First Embodiment)

Figure 1:
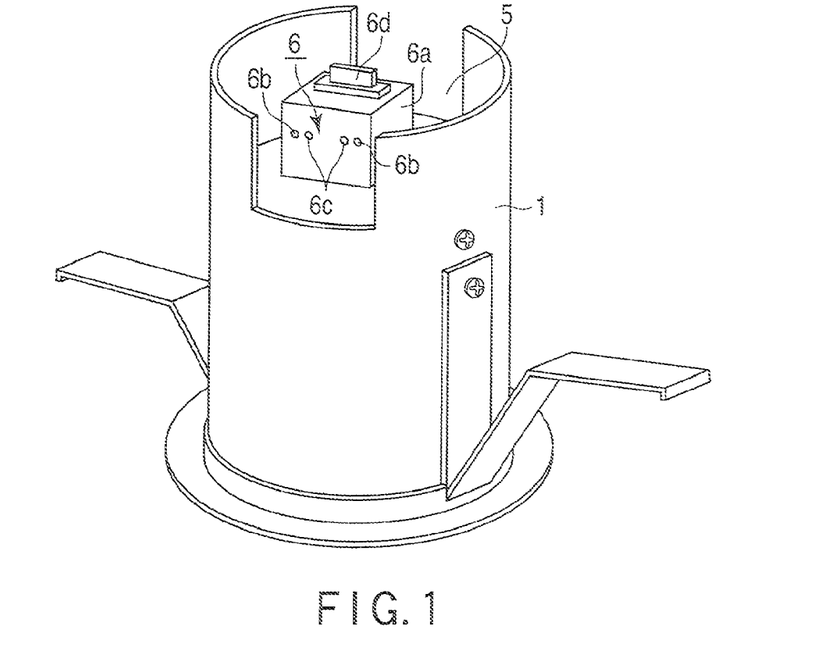
FIG. 1 is a schematic perspective view showing a lighting equipment having a power supply device according to the first embodiment.
Figure 2:
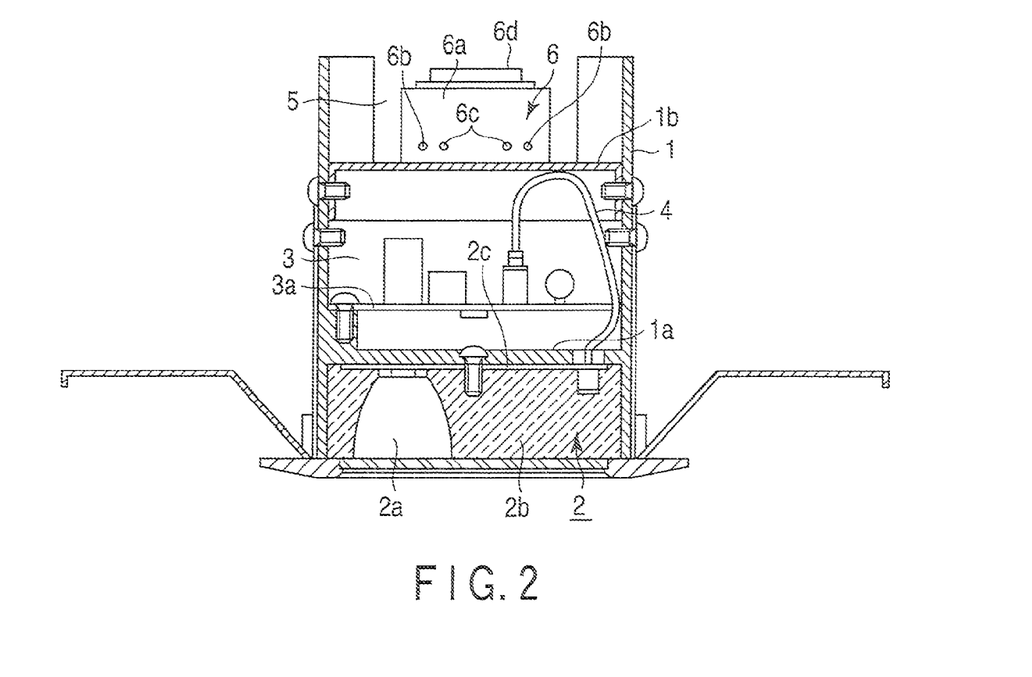
FIG. 2 is a schematic sectional view showing the internal structure of the lighting equipment shown in FIG. 1.

FIGS. 1 and 2 show a lighting equipment which incorporates a power supply device according to an embodiment of the present invention. Referring to FIGS. 1 and 2, reference numeral 1 denotes an equipment main body. This equipment main body 1 is prepared by die-casting aluminum, and is formed into a nearly cylindrical shape having openings at two ends. The interior of this equipment main body 1 is partitioned into three spaces in a vertical direction by partition members 1a and 1b. In a lower space between a lower opening and the partition member 1a, a light source unit 2 is arranged. This light source unit 2 includes a plurality of LEDs 2a as semiconductor light-emitting elements and a reflector 2b for reflecting light rays from the LEDs 2a. The plurality of LEDs 2a are mounted in the lower space, and are allocated at equal intervals along a circumferential direction of a disk-shaped circuit board 2c arranged on the lower surface of the partition member 1a.

A hollow space between the partition members 1a and 1b of the equipment main body 1 is assigned to a power supply chamber 3. In this power supply chamber 3, a circuit board 3a is arranged on an upper portion of the partition member 1a. On this circuit board 3a, electronic components which configure a power supply device required to drive the plurality of LEDs 2a are arranged. This DC power supply device and the plurality of LEDs 2a are connected via lead wires 4.

A space between the partition member or plate 1b and an upper opening of the equipment main body 1 is defined as a power supply terminal chamber 5. In this power supply terminal chamber 5, a power supply terminal block 6 is arranged on the partition member 1b. This power supply terminal block 6 is a terminal block required to supply an AC power of a commercial power supply to the power supply device in the power supply chamber 3, and has outlets 6b as power supply terminals for a power supply cable, outlets 6c used as terminal portions for a feeder cable, a release button 6d used to release a power supply line and feeder line, and the like on two surfaces of a box 6a which is made up of an electrically insulating synthetic resin.

Figure 3:
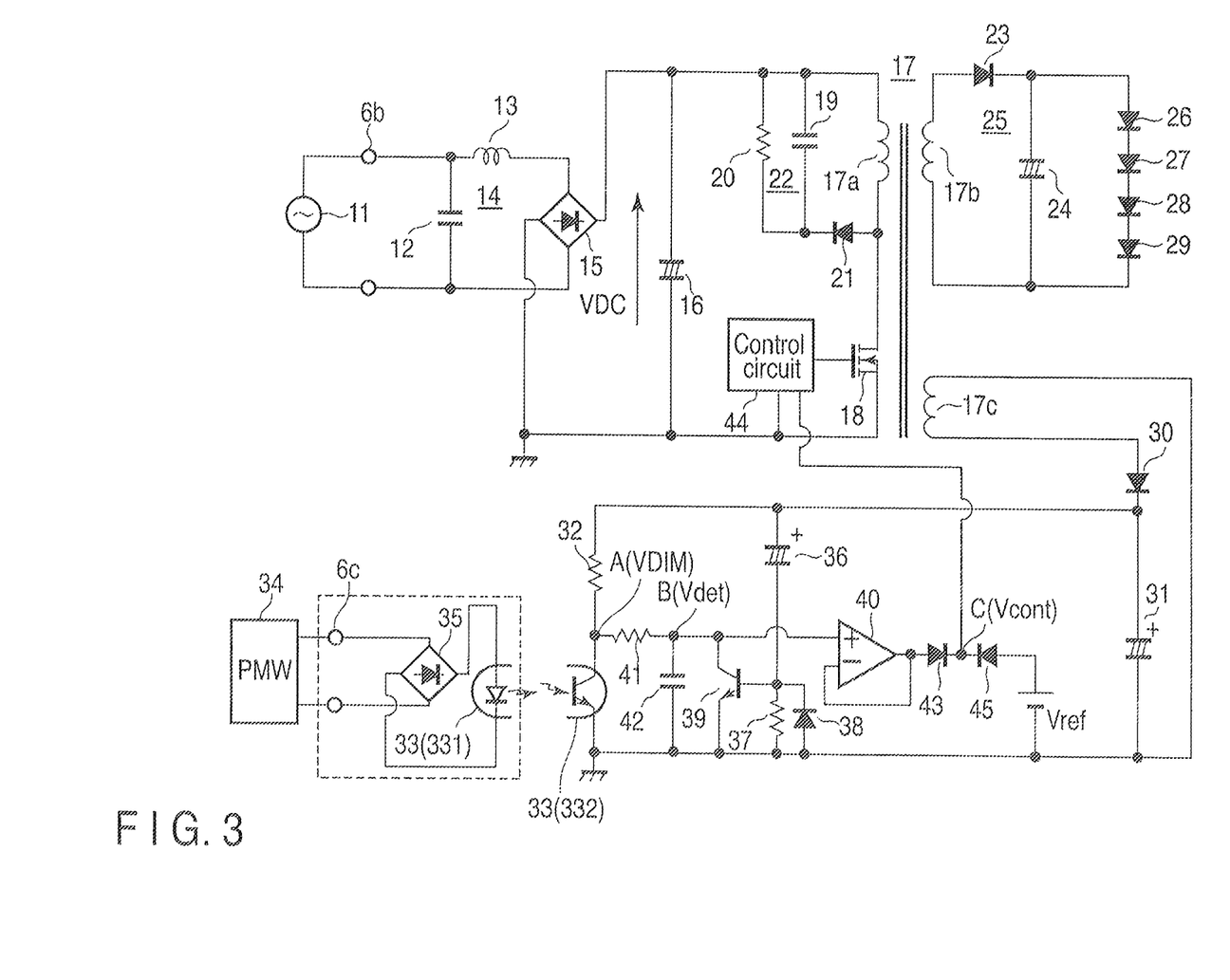
FIG. 3 is a schematic circuit diagram showing an electrical circuit of the power supply device shown in FIG. 1.

FIG. 3 is a circuit diagram of the power supply device according to the embodiment of the present invention, which is incorporated in the power supply chamber 3 of the lighting equipment with the above arrangement.

Figure 4A:
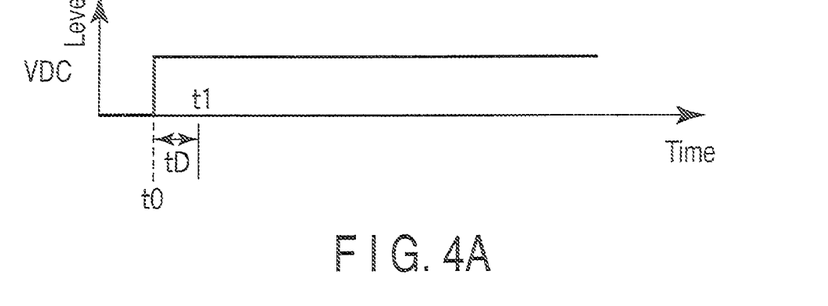
FIG. 4A is a timing chart for explaining the operation of the power supply device shown in FIG. 3.

Referring to FIG. 3, reference numeral 11 denotes an AC power supply as a commercial power supply outside the lighting equipment. This AC power supply 11 is connected to power supply terminals 6b of the lighting equipment shown in FIG. 2 via a lighting switch (not shown) outside the lighting equipment, and a noise filter circuit 14 including a capacitor 12 and inductor 13 is connected to the power supply terminals 6b. In this noise filter circuit 14, the capacitor 12 is connected in parallel, and a full-wave rectifying circuit 15 is connected via the inductor 13 between the power supply terminals. The full-wave rectifying circuit 15 outputs a rectified voltage VDC which is obtained by full-wave rectifying an AC power from the AC power supply 11 in response to ON of the lighting switch, as shown in FIG. 4A. Between the output terminals of the full-wave rectifying circuit 15, a smoothing capacitor 16 which smoothes a ripple current is connected in parallel. The noise filter circuit 14, full-wave rectifying circuit 15, and capacitor 16 form a DC power supply circuit, which is connected to a primary winding 17a of a switching transformer 17 as a flyback transformer.

To the primary winding 17a of the switching transformer 17a as a flyback transformer, a field effect transistor (FET) 18 as a switching element is connected in series. To the two terminals of the smoothing capacitor 16, a series circuit of the primary winding 17a of the switching transformer 17 and FET 18 is connected. The switching transformer 17 has a secondary winding 17b and tertiary winding 17c, which are magnetically coupled to the primary winding 17a.

To the two terminals of the primary winding 17a of the switching transformer 17, a snubber circuit 22 is connected. This snubber circuit 22 includes a capacitor 19, resistor 20, and an anti-backflow diode 21. The capacitor 19 and resistor 20 are connected in parallel, and the parallel circuit of the capacitor 19 and resistor 20 is connected to a node between the primary winding 17a of the switching transistor 17 and the FET 18 via the diode 21. This snubber circuit 22 absorbs a flyback voltage generated at the primary winding 17a of the switching transformer 17, absorbs a ringing voltage generated due to a leakage inductance, and regenerates a current flowing through the primary winding 17a when the FET 18 is disabled. That is, when a flyback voltage is generated, it charges the capacitor 19, and the capacitor 19 discharges the charged voltage via the resistor 20 when the flyback voltage disappears, thus absorbing the flyback voltage by the snubber circuit 22. When a ringing voltage is generated in a leakage inductance of the switching transformer 17, it is used to charge the capacitor 19, and is absorbed by the capacitor 19.

To the secondary winding 17b of the switching transformer 17, a rectifying/smoothing circuit 25 which rectifies and smoothes a voltage generated at the secondary winding 17b is connected. The rectifying/smoothing circuit 25 includes a diode 23 connected in series to the secondary winding 17b, and a smoothing capacitor 24 connected in parallel to the secondary winding 17b. Together with the snubber circuit 22, FET 18, and switching transformer 17, this rectifying/smoothing circuit 25 forms a DC lighting circuit for generating a DC output required to light on the light-emitting diodes.

In this DC lighting circuit, when the FET 18 is turned on and off in response to pulse signals having a certain ON duty ratio output from a control circuit 44, a DC voltage from the full-wave rectifying circuit 15 is converted into a rectangular wave voltage, which is applied to the primary winding of the switching transformer 17. When this rectangular wave voltage appears at the primary winding of the switching transformer 17, a boosted AC voltage is generated from the secondary winding 17b of the switching transformer 17. This AC voltage is rectified by the diode 23 of the rectifying/smoothing circuit 25, the rectified voltage is smoothed by the smoothing capacitor 24, and the smoothed voltage is output from the smoothing capacitor 24 as a DC output.

To the two terminals of the smoothing capacitor 24 of the rectifying/smoothing circuit 25, a plurality of (for example, four) series-connected light-emitting diodes 26 to 29 (corresponding to the LEDs 2a as light sources shown in FIG. 1) as semiconductor light-emitting elements are connected as loads. The series-connected light-emitting diodes 26 to 29 are dimmed and lighted on when they are supplied with a DC current according to a certain DC voltage output from the rectifying/smoothing circuit 25. That is, when the FET 18 is turned on and off in response to switching pulses having a high ON duty ratio, an AC voltage, which is boosted to a relatively high level, appears from the secondary winding 17b of the switching transformer 17, a relatively high DC voltage is applied from the rectifying/smoothing circuit 25 to the light-emitting diodes 26 to 29, and a constant current is supplied to the light-emitting diodes 26 to 29, which are lighted on at a certain luminance level. When the FET 18 is turned on and off in response to switching pulses having a low ON duty ratio, an AC voltage, which is boosted to a relatively low level, appears from the secondary winding 17b of the switching transformer 17, and a relatively high DC voltage is applied from the rectifying/smoothing circuit 25 to the light-emitting diodes 26 to 29, thus dimming and lighting on the light-emitting diodes 26 to 29.

To the tertiary winding 17c of the switching transformer 17, a rectifying/smoothing circuit including a diode 30 and capacitor 31 is connected. The diode 30 is connected in series to a terminal of the tertiary winding 17c to rectify an AC output generated at the tertiary winding 17c. The capacitor 31 is connected in parallel to the tertiary winding 17c via the diode 30, smoothes a rectified output from the diode 30, and outputs the smoothed output as a DC voltage. This rectifying/smoothing circuit connected to the tertiary winding 17c functions as a circuit for detecting voltage application to the light-emitting diodes 26 to 29, and outputs a rectified voltage in synchronism with a voltage output from the rectifying/smoothing circuit 25 connected to the secondary winding 17b.

To the capacitor 31, a series circuit of a resistor 32 and a phototransistor 332 of a photocoupler 33 is connected in parallel. The photocoupler 33 is configured by housing a light-emitting diode 331 and the phototransistor 332, which are electrically isolated from each other and are optically joined, in a single package. Light emitted by the light-emitting diode 331 is received by the phototransistor 332 to conduct the phototransistor 332. The light-emitting diode 331 of the photocoupler 33 is connected to a rectifying circuit 35, which is connected to input terminals 6c (corresponding to the outlets 6c used as feeder cable terminal portions). The input terminals 6c are connected to a dimming operation member 34 arranged on, e.g., a wall surface outside the lighting equipment. The dimming operation member 34 includes a PWM generator (not shown) for generating a PWM dimming signal used to set a dimming depth, and supplies a PWM dimming signal to the rectifying circuit 35 via the input terminals 6c in response to ON of the lighting switch. Therefore, the light-emitting diode 331 is activated to emit light during an ON duty period of the PWM dimming signal, and the phototransistor 332 is conducted during that period. The PWM dimming signal can change a duty ratio of a pulse-shaped signal according to a user operation at the dimming operation member 34, thereby setting a dimming depth according to this duty ratio.

To the capacitor 31, a series circuit of a capacitor 36 and resistor 37 is connected in parallel. The series circuit of the capacitor 36 and resistor 37 forms a differentiating circuit, and generates, based on a voltage output from the capacitor 31, a differentiated output at a node between the capacitor 36 and resistor 37 only for a predetermined time period T. This predetermined time period T is set to be longer than a maximum delay time TD. In this case, the maximum delay time TD is defined as a period after the lighting switch is turned on and an electric power is supplied from the power supply 11 until a dimming control start timing at which a dimming signal is output. To the resistor 37, a diode 38 is connected in parallel to have a polarity shown in FIG. 3. This diode 38 is arranged to remove a charge from the capacitor 36 of the differentiating circuit.

To the node between the capacitor 36 and resistor 37, the base of a transistor 39 as a switching element is connected. The emitter of this transistor 39 is grounded, and the collector is connected to a positive input terminal of an operational amplifier 40. The transistor 39 is enabled only for the predetermined time period T in response to the differentiated output generated at the node between the capacitor 36 and resistor 37. Between ground and a node A between the resistor 32 and phototransistor 332, a series circuit of a resistor 41 and capacitor 42 is connected. A node B between the resistor 41 and capacitor 42 is connected to the collector of the transistor 39, and also to the positive input terminal of the operational amplifier 40. To the node A between the resistor 32 and phototransistor 332, a dimming signal (VDIM) shown in FIG. 4B, which is output by the light-emitting diode 331 and is received by the phototransistor 332, is output. To the node B between the resistor 41 and capacitor 42, a dimming out (Vdet) shown in FIG. 4C, which is obtained by smoothing the dimming signal (VDIM) by the capacitor 42, is output.

Figure 4B:
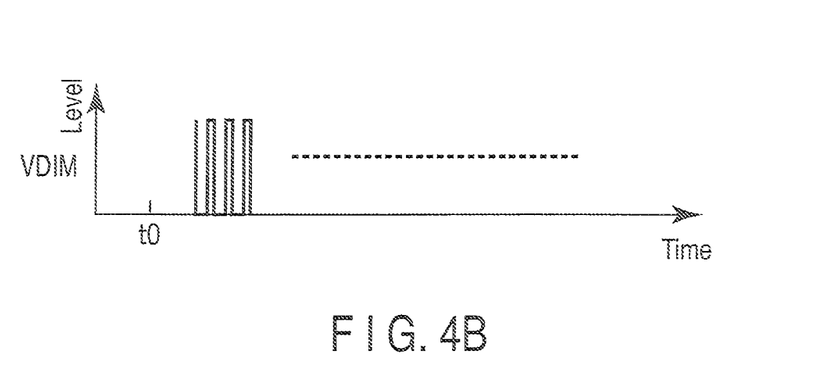
FIG. 4B is a timing chart for explaining the operation of the power supply device shown in FIG. 3.
Figure 4C:
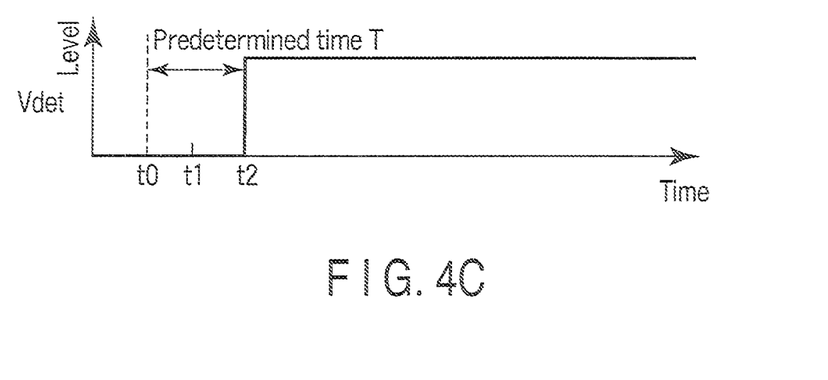
FIG. 4C is a timing chart for explaining the operation of the power supply device shown in FIG. 3.

A negative input terminal of the operational amplifier 40 is connected to its output terminal, which is connected to the control circuit 44 via a diode 43 having a polarity shown in FIG. 3. To the control circuit 44, a reference voltage source Vref is connected via a diode 45 having a polarity shown in FIG. 3. These diodes 43 and 45 form an OR circuit, and their node C outputs a larger one of a signal from the operational amplifier 40 and a reference signal Vref to the control circuit 44 as a control signal Vcont, as shown in FIG. 4E.

The control circuit 44 turns on and off the FET 18 by an operation according to the control signal Vcont to switching-drive the switching transformer 17, thereby controlling an output supplied to the light-emitting diodes 26 to 29. The control circuit 44 is configured by a switching pulse generation circuit whose ON duty ratio is determined according to the level of the control signal Vcont. For example, the control circuit 44 includes a memory which is referred to by the control signal Vcont, an arithmetic circuit which generates pulse signals at an ON duty ratio stored in this memory, and an amplifier which amplifies pulses output from this arithmetic circuit.

The operation of the circuit shown in FIG. 3 will be described below.

Assume that the dimming operation member 34 is set in advance by the user in a state in which the dimming signal member 34 is ready to output a dimming signal having a certain dimming depth, and is set to, for example, light on the light-emitting diodes 26 to 29 by dimming them to a certain intermediate dimming level. Also, assume that the reference signal Vref is set at a level required to light on the light-emitting diodes 26 to 29 at a fixed level, e.g., to have a minimum light amount, as shown in FIG. 4D.

At a timing t0 in a state in which illuminating light can be dimmed in this way, the lighting switch provided to the dimming operation member 34 is operated to turn on (power-activate) the power supply of the lighting equipment, and the power supply of the dimming signal generator 34 is also turned on simultaneously with this ON operation. At this timing t0, in response to power-ON of the lighting equipment, an AC power of the AC power supply 11 is supplied to the full-wave rectifying circuit 15, which outputs a DC voltage shown in FIG. 4A to the ripple current smoothing capacitor 16. This voltage output is applied to the series circuit of the primary side of the switching transformer 17 and the FET 18 in an OFF state. At this timing t0, the FET 18 is set in an OFF state since it is not ON, and no DC voltage is applied to the primary side of the switching transformer 17. As will be described later, after an elapse of a certain delay time TD, the FET 18 is turned on and off, and the DC voltage is applied to the primary side of the switching transformer 17.

Figure 4D:
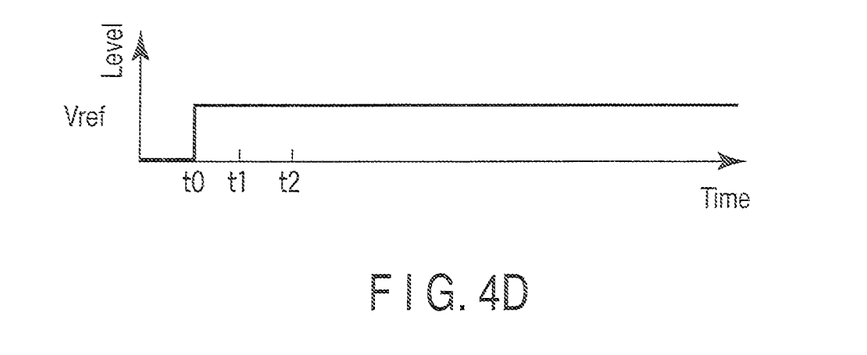
FIG. 4D is a timing chart for explaining the operation of the power supply device shown in FIG. 3.
Figure 4E:
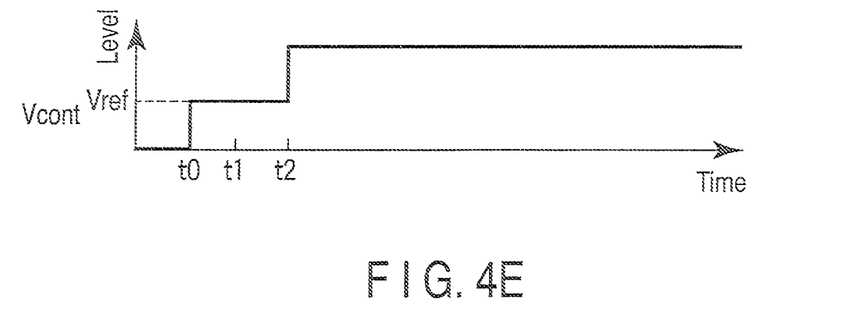
FIG. 4E is a timing chart for explaining the operation of the power supply device shown in FIG. 3.

Also, at the timing t0, the reference signal Vref shown in FIG. 4D is input to the control circuit 44 as the control signal Vcont shown in FIG. 4E via the diode 45. Therefore, the control circuit 44 begins to drive the FET 18 in response to the control signal Vcont having a level of the reference signal Vref. That is, the control circuit 44 generates pulse signals having an ON duty ratio specified by the level of the reference signal Vref with reference to the level of the reference signal Vref, and applies the pulse signals to the gate of the FET 18. In this case, from the timing t0, the control circuit 44 begins to output the pulse signals, as shown in FIG. 4A. The FET 18 is turned on and conducted during an ON period specified by the ON duty ratio, and is kept OFF during an OFF period specified by the ON duty ratio. When the FET 18 is turned on and off in response to the pulse signals, a DC voltage output from the rectifying/smoothing circuit is switched and is converted into a rectangular wave. This rectangular wave is applied to the switching transformer 17. Therefore, the switching transformer 17 is switching-driven. More specifically, in response to an ON operation of the FET 18, a current is supplied to the primary winding 17a of the switching transformer 17 to accumulate an energy. In response to an OFF operation of the FET 18, the energy accumulated on the primary winding 17a is discharged via the secondary winding 17b. Therefore, from the primary winding 17b of the switching transformer 17, an AC output voltage is supplied to the rectifying/smoothing circuit 25, and is converted into a DC voltage output by the rectifying/smoothing circuit 25. This DC voltage output is applied to the light-emitting diodes 26 to 29. Therefore, the light-emitting diodes 26 to 29 are lighted on to have a minimum light amount set as the reference signal Vref.

When an AC voltage is output from the secondary winding 17b of the switching transformer 17, an AC voltage output is also generated at the tertiary winding 17c of the switching transformer 17. This AC voltage is rectified and smoothed by the diode 30 and capacitor 31, and a DC output is generated across the two terminals of the capacitor 31. Therefore, the DC voltage is applied to the differentiating circuit formed by the capacitor 36 and resistor 37. Upon application of this DC voltage, a differentiated output is generated at the node between the capacitor 36 and resistor 37 from a timing t1 during a time period (T−TD) obtained by subtracting the delay time from the predetermined time period T, more properly, only during a period from the timing t1 to a timing t2. This differentiated output is applied to the gate of the transistor 39 to enable the transistor 39. Therefore, the node B between the resistor 41 and capacitor 42 is grounded, and the positive input terminal of the operational amplifier 40 is also grounded.

Also, at the timing t1 delayed from power-ON of the lighting equipment by the switch operation of the dimming operation member 34 by the delay time period TD, the dimming signal generator 34 generates a PWM dimming signal VDIM. For example, at the timing t1 after the delay time TD, as shown in FIG. 4B, with respect to the voltage output shown in FIG. 4A of the ripple current smoothing capacitor 16, the PWM dimming signal (VDIM) is generated at the node A between the resistor 32 and phototransistor 332. However, since the node B between the resistor 41 and capacitor 42 is grounded because the transistor 39 is enabled during the time period (T−TD) after the delay time period TD, this PWM dimming signal (VDIM) is not output to the node B, a PWM dimming output (Vdet) is canceled during this predetermined time period T, more properly, during the time period (T−TD), as shown in FIG. 4C, and the operational amplifier 40 does not generate any dimming output of the level according to the PWM dimming signal (VDIM). Therefore, the light-emitting diodes 26 to 29 are lighted on to have a minimum light amount by the operation of the control circuit 44 which receives the reference signal Vref, as described above.

After that, at the timing t2 when the predetermined time period T is elapsed, the differentiated output that appears at the node between the capacitor 36 and resistor 37 disappears, thus disabling the transistor 39. Therefore, the PWM dimming signal (VDIM) which appears at the node A between the resistor 32 and phototransistor 332 is transmitted to the node B between the resistor 41 and capacitor 42, thus generating the dimming output (Vdet), as shown in FIG. 4C. As a result, the dimming output (Vdet) is amplified by the operational amplifier 40, and is input to the control circuit 44 via the diode 43. Since this dimming output (Vdet) is larger than the reference signal Vref shown in FIG. 4D, the dimming output (Vdet) is input to the control circuit 44. Therefore, the control circuit 44 generates pulse signals having an ON duty ratio specified according to the level of the dimming output (Vdet), and applies them to the gate of the FET 18. The FET 18 is turned on and off in response to the pulse signals having the ON duty ratio according to the level of the dimming output (Vdet). Therefore, an AC output voltage is supplied from the secondary winding 17b of the switching transformer 17 to the rectifying/smoothing circuit 25, and is converted into a DC voltage output by the rectifying/smoothing circuit 25. This DC voltage output is applied to the light-emitting diodes 26 to 29. Therefore, the light-emitting diodes 26 to 29 are lighted on to have a light amount specified according to the level of the dimming output (Vdet).

In the circuit shown in FIG. 3, a dimming signal is canceled during the predetermined time period T from a timing immediately after power-ON, and the light-emitting diodes 26 to 29 are lighted on to have a predetermined light amount (e.g., a minimum light amount). After an elapse of the predetermined time period T, cancellation of the dimming signal is released, and the light-emitting diodes 26 to 29 are lighted on to have a light amount instructed by the dimming signal. Therefore, the influence of the dimming signal can be surely excluded only during the predetermined time period T from the timing immediately after power-ON, and a phenomenon of causing a full light state only for a moment immediately after activation due to an output delay of the dimming signal can be avoided. As a result, a natural lighting state as the lighting equipment can be obtained, thus improving the merchantability of the lighting equipment.

(Modification 1)

In the aforementioned embodiment, the light-emitting diodes 26 to 29 are lighted on to have a predetermined light amount (e.g., a minimum light amount) only during the predetermined time period T from the timing immediately after power-ON. After an elapse of the predetermined time period T, the light-emitting diodes 26 to 29 are lighted on to have a light amount instructed by the dimming signal. However, for example, when the level of the reference signal Vref is further reduced to set a signal level (an operable level of the control circuit 44) as low as the light-emitting diodes 26 to 29 cannot be lighted on, the light-emitting diodes 26 to 29 are lighted off during the predetermined time period T from the timing immediately after power-ON. After an elapse of the predetermined time period T, the light-emitting diodes 26 to 29 can be lighted on to have a light amount instructed by the dimming signal.

(Modification 2)

In order to allow the setting level of the reference signal Vref to be variable, a dimming function that can arbitrary control the light amount of the light-emitting diodes 26 to 29, which are lighted on after an elapse of the predetermined time period T from the timing immediately after power-ON can be provided to the power supply device.

(Modification 3)

Furthermore, a large time constant specified by the aforementioned resistor 41 and capacitor 42 may be set. Based on the dimming signal (VDIM) at the node A between the resistor 32 and phototransistor 332, the dimming output (Vdet) output to the node B between the resistor 41 and capacitor 42 is slowly increased by taking a certain time. Therefore, when the time constant is set so that this dimming output (Vdet) gives a minimum level required to light on the light-emitting diodes 26 to 29 after an elapse of the aforementioned predetermined time period T to the control signal, the control circuit 44 can be controlled to fade in the luminance of the light-emitting diodes 26 to 29 by the control signal Vcont having a level specified depending on an increase in dimming output (Vdet). In this modification, the differentiating circuit of the capacitor 36 and resistor 37, and the transistor 39, which form a circuit for canceling the dimming signal, can be omitted.

(Second Embodiment)

A power supply circuit according to the second embodiment of the present invention will be described below.

Figure 5:
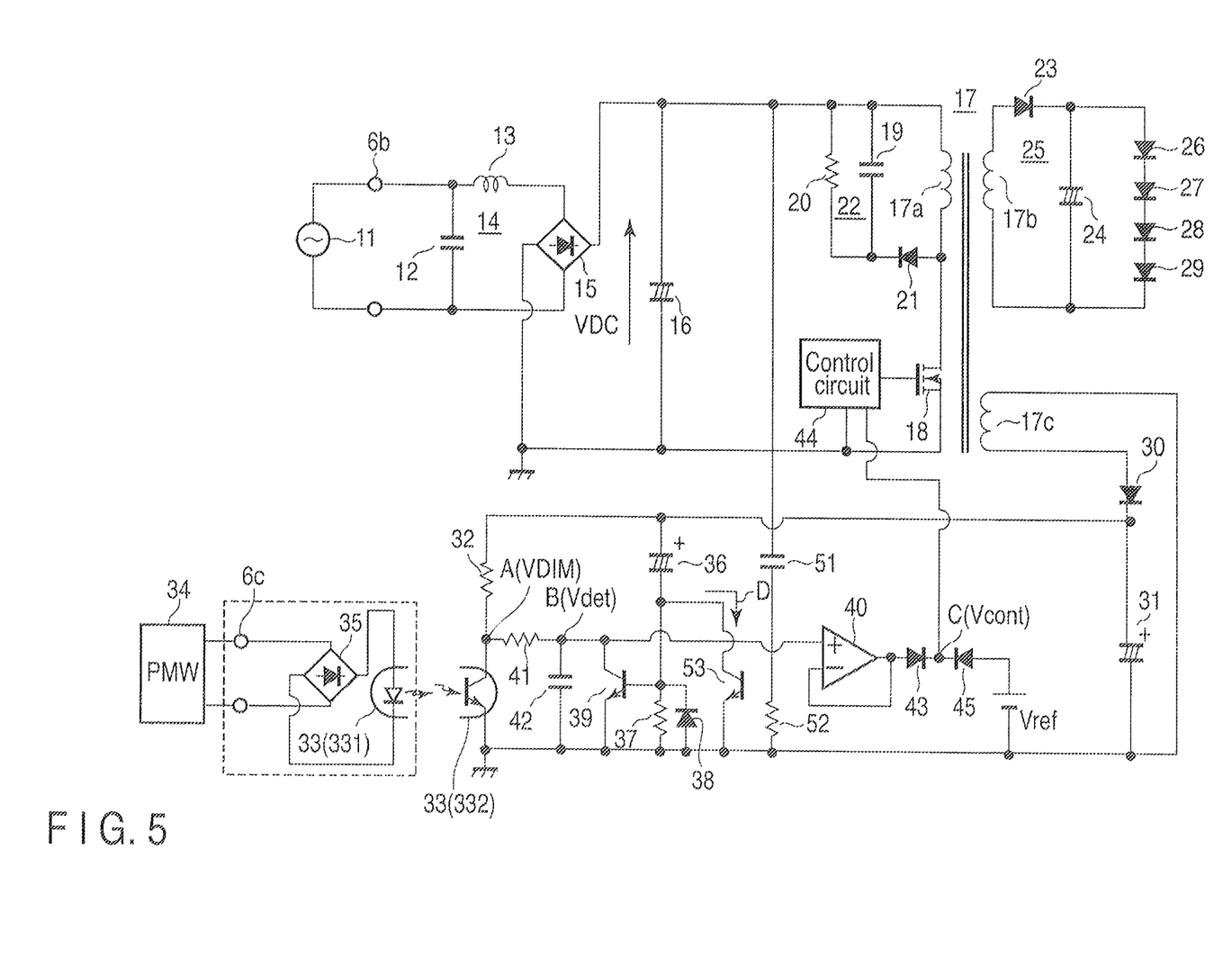
FIG. 5 is a circuit diagram showing a circuit of a power supply device according to the second embodiment.

FIG. 5 shows a power supply circuit according to the second embodiment of the present invention. In FIG. 5, the same reference numerals denote the same parts as in FIG. 3, and a description thereof will not be repeated.

In the circuit shown in FIG. 5, a series circuit of a capacitor 51 and resistor 52 is connected between ground and a node between a positive output terminal of a full-wave rectifying circuit 15 and a ripple current smoothing capacitor 16. The series circuit of the capacitor 51 and resistor 52 forms a differentiating circuit, which generates an output at a node between the capacitor 51 and 52 for a predetermined time based on an output from the ripple current smoothing capacitor 16. To the node between the capacitor 51 and resistor 52, the base of a transistor 53 is connected. The emitter of this transistor 53 is grounded, and the collector is connected to a capacitor 36. The transistor 53 is turned on for a predetermined time by the output generated at the node between the capacitor 51 and resistor 52.

In the power supply circuit according to the second embodiment, when an AC power of an AC power supply 11 is supplied to the full-wave rectifying circuit 15 upon power-ON of a lighting equipment, and an output is generated at the ripple current smoothing capacitor 16 based on the output from the full-wave rectifying circuit 15, a differentiated output is generated only for a predetermined short time period at the node between the capacitor 51 and resistor 52. Therefore, during the output period of the differentiated output, the transistor 53 is turned on. In response to ON of the transistor 53, a residual charge on the capacitor 36 is forcibly discharged in a direction of an arrow D via a diode 38 and the transistor 53, thus resetting a differentiating circuit formed by the capacitor 36 and a resistor 37.

In this power supply circuit, immediately after power-ON, the differentiating circuit formed by the capacitor 36 and resistor 37 is forcibly reset. Therefore, a predetermined time period T specified by the differentiating circuit formed by the capacitor 36 and resistor 37 can be accurately set, and an operation for canceling a dimming signal during the predetermined time period T from a timing immediately after power-ON can be stably realized.

As described above, according to the present invention, since the dimming signal is canceled only during the predetermined time from the timing immediately after power-ON, a phenomenon of causing a full light state only for a moment immediately after activation due to an output delay of the dimming signal can be avoided, thus obtaining a stable lighting state.

According to the present invention, during the predetermined time in which the dimming signal is canceled from the timing immediately after power-ON, semiconductor light-emitting elements can be set in one of light-on, light-off, and dimmed lighting states.

Likewise, according to the present invention, since the differentiating circuit used to decide the predetermined time in which the dimming signal is canceled can be forcibly reset, the operation for canceling the dimming signal can be stably attained.

Note that in the aforementioned embodiment, immediately after power-ON, the differentiating circuit formed by the capacitor 36 and resistor 37 is forcibly reset, and such operation may be performed at the time of a power-OFF operation or a light-off operation in response to an external signal.

In addition, the present invention is not limited to the aforementioned embodiments, and various modifications may be made without departing from the scope of the invention when it is practiced. For example, in the aforementioned embodiments, light-emitting diodes have been exemplified as semiconductor light-emitting elements. However, the present invention is applicable to a case using other semiconductor light-emitting elements such as laser diodes. Also, in the aforementioned embodiments, the power supply circuit including the AC power supply 11 has been described. However, the AC power supply 11 may be arranged outside the device. Furthermore, in the aforementioned embodiments, an analog circuit has been exemplified. However, a control method using a microcomputer and digital processing may be adopted.

The embodiments can provide a power supply device which assures a stable lighting state of a semiconductor light-emitting element, and a lighting equipment.

According to the embodiments, a lighting equipment can also be provided, which can obtain a stable lighting state of semiconductor light-emitting elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply device comprising:
    a DC output generation module configured to receive AC power, convert the AC power into DC power, and output the DC power;
    a semiconductor light-emitting element configured to receive the DC power output from the DC output generation module, and to emit light; and
    a control module configured to receive a dimming signal, and to control the DC power output from the DC output generation module in accordance with the dimming signal, the control module controlling the DC output generation module to dim and turn on or off the semiconductor light-emitting element by canceling control of the DC power based on the dimming signal during a predetermined time period beginning immediately after the AC power is supplied,
    wherein the control module comprises:
        a generation circuit configured to generate a first control signal based on the dimming signal,
        a differentiating circuit comprising a resistor and a capacitor, wherein the differentiating circuit is configured to output a differentiated signal in response to supply of the AC power,
        a switching element, wherein the switching element is turned on in response to the differentiated signal during a time period shorter than the predetermined period and short-circuits the generation circuit, and
        a reset circuit configured to discharge the capacitor immediately after the AC power is supplied, wherein the differentiating circuit is configured to generate the differentiated signal after the capacitor is discharged.

2. The power supply device according to claim 1, wherein the control module is further configured to:
    generate a second control signal based on a reference signal, control the DC output generation module to dim and turn on or off the semiconductor light-emitting element using the second control signal during the predetermined period, and control the DC output generation module to turn on the semiconductor light-emitting element according to the dimming signal using the first control signal after the predetermined period has elapsed.

3. A lighting equipment comprising:

a power supply device according to claim 1; and an equipment main body having the power supply device.

4. An apparatus comprising:

a control module configured to receive a dimming signal, and to control DC power output from a DC output generation module in accordance with the dimming signal, the control module controlling the DC output generation module to dim and turn on or off a light-emitting element by canceling control of the DC power based on the dimming signal during a predetermined time period beginning after AC power is supplied to the DC output generation module, wherein the control module comprises:

a generation circuit configured to generate a first control signal based on the dimming signal, a differentiating circuit comprising a resistor and a capacitor, wherein the differentiating circuit is configured to output a differentiated signal in response to supply of the AC power, a switching element, wherein the switching element is turned on in response to the differentiated signal during a time period shorter than the predetermined period and short-circuits the generation circuit, and a reset circuit configured to discharge the capacitor after the AC power is supplied, wherein the differentiating circuit is configured to generate the differentiated signal after the capacitor is discharged.

* * * * *